(12) United States Patent
Suzaki et al.

(10) Patent No.: US 11,399,376 B2
(45) Date of Patent: Jul. 26, 2022

(54) METHOD AND SYSTEM IN A WIRELESS COMMUNICATIONS FOR ESTIMATING QUALITY BASED ON LEARNING MODEL

(71) Applicant: NIPPON TELEGRAPH AND TELEPHONE CORPORATION, Tokyo (JP)

(72) Inventors: Kohei Suzaki, Tokyo (JP); Ryo Miyatake, Tokyo (JP); Yusuke Asai, Tokyo (JP); Hiroyuki Shiba, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 79 days.

(21) Appl. No.: 16/968,938

(22) PCT Filed: Feb. 13, 2019

(86) PCT No.: PCT/JP2019/005016
§ 371 (c)(1),
(2) Date: Aug. 11, 2020

(87) PCT Pub. No.: WO2019/159937
PCT Pub. Date: Aug. 22, 2019

(65) Prior Publication Data
US 2021/0051678 A1 Feb. 18, 2021

(30) Foreign Application Priority Data
Feb. 13, 2018 (JP) .............................. JP2018-023540

(51) Int. Cl.
*H04W 72/08* (2009.01)
*H04W 4/029* (2018.01)
*G06N 20/00* (2019.01)

(52) U.S. Cl.
CPC .......... *H04W 72/085* (2013.01); *G06N 20/00* (2019.01); *H04W 4/029* (2018.02)

(58) Field of Classification Search
CPC ..... H04W 24/10; H04W 24/02; H04W 24/00; H04W 72/08; H04W 4/029;
(Continued)

(56) References Cited

U.S. PATENT DOCUMENTS 10,599,205 B2* 3/2020 He et al. ................ G06F 1/3234
11,272,433 B2* 3/2022 Karimli et al. ....... H04W 48/16
(Continued)

FOREIGN PATENT DOCUMENTS

| JP | 2010-147823 A | 7/2010 |
| JP | 2013-58948 A | 3/2013 |

OTHER PUBLICATIONS

So, Hideya, et al., "Evaluation of Delay Characteristics under Other System Interferences for Highly Reliable and Low-Delay Wireless Access Using Multiple Radio Redundant Transmission," The Institute of Electronics, IEICE Technical Report, RCC 2017-42 (Jul. 2017).

(Continued)

*Primary Examiner* — Meless N Zewdu

(57) ABSTRACT

A disclosure relates to a wireless communication system for instructing terminals to control resources based on radio wave conditions. The system comprises: generating, by a base station, information on radio wave conditions based on an uplink wireless signal from terminals, storing learning model data for generating the information on quality of communications with an amount of processing that is equal to or less than a threshold value, selecting learning model data on the basis of known information, and transmitting the learning model data and a downlink wireless signal, receiving, by the terminal, the learning model data, generating
(Continued)

information representing the radio wave environment based on the downlink wireless signal, generating information representing quality of communication based on the learning model data and the information representing the radio wave condition, and controlling the communication resource for the wireless signal based on the information representing quality of communication.

20 Claims, 9 Drawing Sheets

(58) Field of Classification Search
CPC ... H04W 72/085; H04W 92/10; H04W 16/18; H04W 28/06; H04W 28/0967; H04W 28/0835; H04W 28/0838; H04W 28/16; H04W 28/24; H04W 76/00; H04W 76/10; H04W 76/11; H04W 88/00; H04W 88/02; H04W 88/08; H04W 88/18; H04W 92/00; H04W 92/02; H04W 92/04; H04W 92/16; H04W 92/12; H04W 16/22; H04W 16/14; H04W 28/0231; H04W 8/08; H04W 52/18; H04W 52/143; H04W 8/18; H04W 8/22; H04W 8/20; G06N 20/00; H04B 17/391; H04B 17/309; G01S 5/02

See application file for complete search history.

(56) References Cited

U.S. PATENT DOCUMENTS

| | | | |
|---|---|---|---|
| 2012/0243427 A1* | 9/2012 | Brisebois et al. | 370/252 |
| 2017/0118688 A1* | 4/2017 | Guvenc | H04W 36/20 |
| 2020/0236560 A1* | 7/2020 | Zhao et al. | H04W 16/18 |
| 2021/0075528 A1* | 3/2021 | Akimoto et al. | H04B 17/3913 |

OTHER PUBLICATIONS

Sasagi, Hirofumi, et al., "Proposal of Radio Environment Recognition Technology Based on State Transition Model Considering Intersystem Interference in Frequency Sharing Environment," The Institute of Electronics, IEICE Technical Report, SR 2015-6 (May 2015).

International Search Report, PCT/JP2019/005016, dated Apr. 23, 2019, Japan Patent Office.

* cited by examiner

METHOD AND SYSTEM IN A WIRELESS COMMUNICATIONS FOR ESTIMATING QUALITY BASED ON LEARNING MODEL

CROSS-REFERENCE TO RELATED APPLICATIONS

This application is a U.S. 371 Application of International Patent Application No. PCT/JP2019/005016, filed on 13 Feb. 2019, which application claims priority to and the benefit of JP Application No. 2018-023540, filed on 13 Feb. 2018, the disclosures of which are hereby incorporated herein by reference in their entireties.

TECHNICAL FIELD

The present invention relates to a wireless communication system, a wireless communication method, a base station, and a terminal.

BACKGROUND ART

An increase in communication traffic causes frequency resources to be scarce. Thus, communication with high spectral efficiency and reliable communication in which Quality of Service (QoS) is secured are required in a wireless communication system that executes wireless communication between a base station and a terminal. In an actual radio wave environment, signal quality fluctuates greatly, a throughput decreases, and a delay time increases due to various factors such as fading and interference. Thus, a radio scheme in which a plurality of bands are used simultaneously such that communication is possible with high reliability and low latency has been proposed (see Non Patent Literature 1).

It is assumed that a situation in which a frequency is maximally used will continue in the future. To efficiently use a frequency, control of communication resources such as switching between used frequency bands and changing a communication scheme is important. To efficiently control communication resources, it is necessary to correctly recognize a radio wave environment. As a technology for recognizing a radio wave environment (a radio wave environment recognition technology), a technology for recognizing a radio wave environment using a statistical model has been proposed (see Non Patent Literature 2).

While it is important to correctly model these radio wave environments, there are many indeterminate elements in an actual radio wave environment, such as a free space loss due to multipath fading, shadowing, and distance and a loss due to radio wave interference from other terminals. This makes it difficult to correctly model each radio wave environment.

A method for determining a radio wave environment also includes a simulation-based method such as a ray tracing method. However, in the simulation-based method, a computation process is enormous, and a detailed spatial model is required. Since a computation result is a very large amount of vector data, a computation process in each terminal is difficult. Furthermore, in the simulation-based method, only the radio wave intensity in a radio wave environment is estimated, and the simulation-based method is insufficient for estimating a frequency or an arrival area of an interference signal.

To consider these elements in the simulation-based method, a generation source and generation frequency of the interference signal also need to be estimated. Ultimately required information is information indicating at what degree of communication quality or communication speed the wireless communication system can perform communication. Accordingly, knowing a radio wave environment such as a situation of the interference signal is only an intermediate solution. Nevertheless, in a ray tracing method, an interference model, or the like, it is necessary to design a radio wave environment model after ascertaining all of various parameters such as a position of an interference source through measurement or the like. Thus, the simulation-based method is a very laborious method.

On the other hand, with deep learning, which is part of machine learning and has been receiving attention in recent years, it is possible to estimate communication quality or the like according to a change in a radio wave environment including an influence of an interference signal even when parameters of the interference signal cannot be directly known from obtained data.

CITATION LIST

Non Patent Literature

Non Patent Literature 1: Hideya So and four others, "Evaluation of delay characteristics under other system interference for high reliability and low latency wireless access using a plurality of wireless redundant transmissions," IEICE Technical Report, RCC2017-42, pp. 155-160, July 2017

Non Patent Literature 2: Hirofumi Sasaki and three others, "Proposed radio wave environment recognition technology based on a state transition model in consideration of an inter-system interference in a frequency sharing environment," IEICE Technical Report, SR2015-6, pp. 31-38, May 2015

SUMMARY OF THE INVENTION

Technical Problem

A computation process of the deep learning, which is part of the machine learning, uses a large number of computation resources of a device and requires a large amount of supervised data (correct answer data). In mobile communication, since a radio wave environment changes according to a movement of a terminal, the number of required pieces of supervised data is large. Thus, it is difficult for each terminal to execute a computation process of the deep learning, which is part of the machine learning. Further, it is difficult to apply radio wave environment data at a specific position within a cell on other positions within the cell, even in the deep learning, which is part of the machine learning. Thus, the wireless communication system needs to collect information at the specific position within the cell to execute the deep learning, which is part of the machine learning. However, in a wireless communication system of the related art, each terminal cannot be caused to execute resource control according to a radio wave environment in some cases.

In view of the foregoing, an object of the present invention is to provide a wireless communication system, a wireless communication method, a base station, and a terminal capable of causing each terminal to execute resource control according to a radio wave environment.

Means for Solving the Problem

An aspect of the present invention is a wireless communication system including: a base station including a base station side generation unit configured to generate information on a radio wave environment in a cell on the basis of an uplink radio signal, a model unit configured to store, for each piece of known information, learning model data with which information on communication quality can be generated on the basis of the information on the radio wave environment, with a throughput equal to or less than a threshold value, a selection unit configured to select the learning model data on the basis of the known information, and a transmission unit configured to transmit the learning model data that is selected and a downlink radio signal; and a terminal including a model acquisition unit configured to acquire the learning model data, a terminal side generation unit configured to generate the information on the radio wave environment on the basis of a downlink radio signal, a measurement unit configured to generate the information on the communication quality on the basis of the learning model data that is acquired and the information on the radio wave environment, and a resource control unit configured to control communication resources for a radio signal on the basis of the information on the communication quality that is generated.

An aspect of the present invention is the wireless communication system, wherein the base station further includes a position estimation unit configured to estimate a position of the terminal, and the known information is information indicating the position of the terminal in the cell.

An aspect of the present invention is the wireless communication system, wherein the base station further includes an updating unit configured to update the learning model data until the throughput is equal to or less than the threshold value, on the basis of supervised data that is information in which the information on the communication quality, the information on the radio wave environment, and the known information are associated with each other.

An aspect of the present invention is the wireless communication system, wherein the updating unit updates the learning model data in a case where a request signal is acquired from the terminal.

An aspect of the present invention is the wireless communication system, wherein the terminal further includes an adjustment unit configured to adjust an error of a parameter value of the information on the communication quality according to the communication quality, and the resource control unit controls the communication resources for the radio signal on the basis of the information on the communication quality in which the error of the parameter value is adjusted.

An aspect of the present invention is a wireless communication method executed by a wireless communication system including a base station and a terminal, the method including, by the base station, generating information on a radio wave environment in a cell on the basis of an uplink radio signal, storing, for each piece of known information, learning model data with which information on communication quality can be generated on the basis of the information on the radio wave environment, with a throughput equal to or less than a threshold value, selecting the learning model data on the basis of the known information, and transmitting the learning model data that is selected and a downlink radio signal; and, by the terminal, acquiring the learning model data, generating the information on the radio wave environment on the basis of a downlink radio signal, generating the information on the communication quality on the basis of the learning model data that is acquired and the information on the radio wave environment, and controlling communication resources for a radio signal on the basis of the information on the communication quality that is generated.

An aspect of the present invention is a base station including a base station side generation unit configured to generate information on a radio wave environment in a cell on the basis of an uplink radio signal, a model unit configured to store, for each piece of known information, learning model data with which information on communication quality can be generated on the basis of the information on the radio wave environment, with a throughput equal to or less than a threshold value, a selection unit configured to select the learning model data on the basis of the known information, and a transmission unit configured to transmit the learning model data that is selected and a downlink radio signal.

An aspect of the present invention is a terminal configured to communicate with a base station including a base station side generation unit configured to generate information on a radio wave environment in a cell on the basis of an uplink radio signal, a model unit configured to store, for each piece of known information, learning model data with which information on communication quality can be generated on the basis of the information on the radio wave environment, with a throughput equal to or less than a threshold value, a selection unit configured to select the learning model data on the basis of the known information, and a transmission unit configured to transmit the learning model data that is selected and a downlink radio signal, the terminal includes a model acquisition unit configured to acquire the learning model data, a terminal side generation unit configured to generate the information on the radio wave environment on the basis of a downlink radio signal, a measurement unit configured to generate the information on the communication quality on the basis of the learning model data that is acquired and the information on the radio wave environment, and a resource control unit configured to control communication resources for a radio signal on the basis of the information on the communication quality.

Effects of the Invention

According to the present invention, each terminal can be caused to execute resource control according to a radio wave environment.

DESCRIPTION OF EMBODIMENTS

Embodiments of the present invention will be described with reference to the drawings.

First Embodiment

Figure 1:
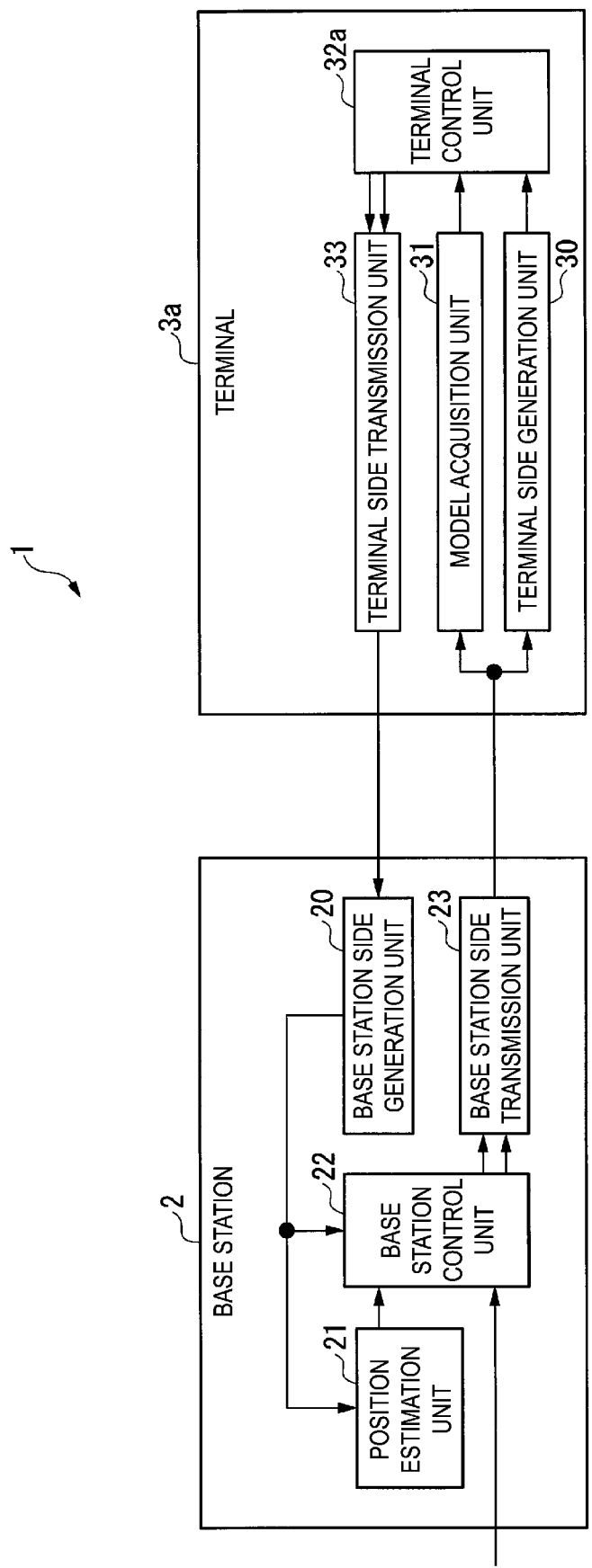
FIG. 1 is a diagram illustrating an example of a configuration of a wireless communication system.

FIG. 1 is a diagram illustrating an example of a configuration of a wireless communication system 1. The wireless communication system 1 includes a base station 2 (base station device) and one or more terminals 3a (terminal devices). The wireless communication system 1 is a system that performs wireless communication between the base station 2 and each terminal 3a. Hereinafter, a direction of communication from the terminal 3a to the base station 2 is referred to as "uplink." Hereinafter, a direction of communication from the base station 2 to the terminal 3a is referred to as "downlink."

The base station 2 forms a cell (communication area) through a downlink radio signal using radio waves. The base station 2 communicates with the terminal 3a located in the cell.

The base station 2 includes a base station side generation unit 20, a position estimation unit 21, a base station control unit 22, and a base station side transmission unit 23.

The base station side generation unit 20 acquires an uplink radio signal from the terminal 3a. The uplink radio signal is used as a pilot signal, terminal identification information (an address), a request signal, error information, and information on a position of the terminal 3a (hereinafter, referred to as "terminal position information"). The pilot signal is a signal including information with a predetermined pattern. The terminal identification information is identification information assigned to the terminal 3a. The request signal is a signal (a trigger signal) for requesting the base station 2 to transmit predetermined data. The error information is information indicating a difference between a parameter value of information actually input to learning model data and a parameter value of information assumed to be input to the learning model data in a learning phase. For example, the error information can be detected through calculation of a difference between a parameter value of communication quality information, which is an output from the learning model data, and a parameter value of communication quality information expected to be the output from the learning model data. The parameter value of the communication quality information expected to be the output from the learning model data is obtained through a learning process for the learning model data. The error information is represented, for example, by a value of a squared error. The base station side generation unit 20 generates a received power value of the uplink radio signal. The base station side generation unit 20 outputs the pilot signal and the terminal position information to the position estimation unit 21.

The base station side generation unit 20 generates information on a radio wave environment (hereinafter referred to as "radio wave environment information") in the cell on the basis of the uplink radio signal. The radio wave environment information is, for example, information that is determined according to transmission power, interference, and reflection of transmitted radio waves. The radio wave environment information is represented, for example, using at least one of a received power value, a packet interval, a center frequency, a Band Width (BW), a communication address, a modulation scheme, and identification information (SSID) of another base station (an access point). The received power value is represented by, for example, received strength (a Received Signal Strength Indicator (RSSI)). The packet interval is represented by, for example, a Bit Error Rate (BER) or a Packet Error Rate (PER). The base station side generation unit 20 outputs the radio wave environment information and the terminal identification information to the base station control unit 22. In a case where the base station side generation unit 20 acquires the request signal, the base station side generation unit 20 outputs the request signal to the base station control unit 22.

The position estimation unit 21 estimates a channel matrix of a radio signal on the basis of the pilot signal. The position estimation unit 21 may estimate the directivity of the radio signal and a distance attenuation amount of a free space loss on the basis of the pilot signal. The position estimation unit 21 estimates the terminal position information on the terminal 3a specified by the terminal identification information according to an estimation result based on the pilot signal. The position estimation unit 21 outputs the estimated terminal position information to the base station control unit 22.

The base station control unit 22 stores data of a machine learning model (hereinafter referred to as "learning model data") indicating a relationship between the communication quality information and the radio wave environment information in the cell, for each piece of known information that is information that can be acquired by the base station 2. An input for the learning model data is the radio wave environment information. An output from the learning model data is the communication quality information. The output from the learning model data may be the error information. The communication quality information is represented by, for example, a throughput of each terminal 3a. The known information may be, for example, the terminal position information, and information on the number (total number) of terminals 3a located in the cell. In a case where the number of terminals 3a located in the cell has a correlation with a time zone, the known information may be represented by information indicating the time zone. Hereinafter, the known information is the terminal position information as an example. The learning model data may be represented in the form of a function with the radio wave environment information as an argument and a function value as the communication quality information.

The base station control unit 22 acquires supervised data (hereinafter referred to as "quality environment position supervised data"), which is data in which the communication quality information, the radio wave environment information, and the terminal position information are associated with each other, from an external device. The base station control unit 22 stores, as the quality environment position supervised data, supervised data that is data in which the communication quality information generated by the base station control unit 22, the generated radio wave environment information, and the terminal position information are associated with each other.

The base station 2 can acquire a large amount of data for updating the learning model data from a plurality of terminals 3a. Since the base station 2 does not move, the base station 2 can generate the learning model data for each position in the cell. Furthermore, since high computation process capacity is required for a computation process using the machine learning model, the base station 2 having greater computation process capacity than the terminal 3a executes a large scale computation process such as updating of the learning model data (a learning process).

The base station control unit 22 executes updating (a learning process) of the learning model data for each piece of terminal position information on the basis of the quality environment position supervised data. The base station control unit 22 selects communication resources for a downlink radio signal. The base station side transmission unit 23 transmits the downlink radio signal to the terminal 3a on the basis of a result of selecting the communication resources for the downlink radio signal. The base station side transmission unit 23 performs broadcast transmission or unicast transmission of the learning model data as one of downlink radio signals to the terminal 3a. The base station control unit 22 transmits learning model data selected according to the terminal position information from among a plurality of pieces of the learning model data for which the learning process has been executed, to the terminal 3a. A frequency at which the base station side transmission unit 23 transmits the learning model data to the terminal 3a may be any frequency. Note that the base station side transmission unit 23 may transmit the learning model data to the terminal 3a through wired communication.

The terminal 3a executes wireless communication with the base station 2. That is, the terminal 3a acquires the downlink radio signal from the base station 2. Furthermore, the terminal 3a transmits the uplink radio signal to the base station 2.

The terminal 3a includes a terminal side generation unit 30, a model acquisition unit 31, a terminal control unit 32a, and a terminal side transmission unit 33.

The terminal side generation unit 30 acquires a radio signal other than the learning model data among downlink radio signals from the base station 2. The terminal side generation unit 30 generates the radio wave environment information on the basis of the radio signal other than the learning model data among the downlink radio signals. The terminal side generation unit 30 outputs the radio wave environment information to the terminal control unit 32a.

The model acquisition unit 31 acquires the learning model data selected by the base station 2 as one of the downlink radio signals from the base station 2. The model acquisition unit 31 outputs the learning model data to the terminal control unit 32a. The terminal control unit 32a estimates communication quality on the basis of the acquired learning model data. That is, the terminal control unit 32a generates the communication quality information according to the radio wave environment information through a computation process in which the radio wave environment information is an input for the learning model data. Since there is symmetry with respect to a communication path or the like between the uplink radio signal and the downlink radio signal, the terminal control unit 32a can generate the communication quality information by using the downlink radio signal instead of the uplink radio signal as the input for the learning model data. The terminal control unit 32a controls the communication resources for the radio signal on the basis of a measurement result of the communication quality. The terminal side transmission unit 33 transmits the uplink radio signal to the base station 2. The uplink radio signal includes, for example, notification information for requesting the base station to control the communication resources for the downlink radio signal (hereinafter referred to as "downlink communication resource control request information").

Figure 2:
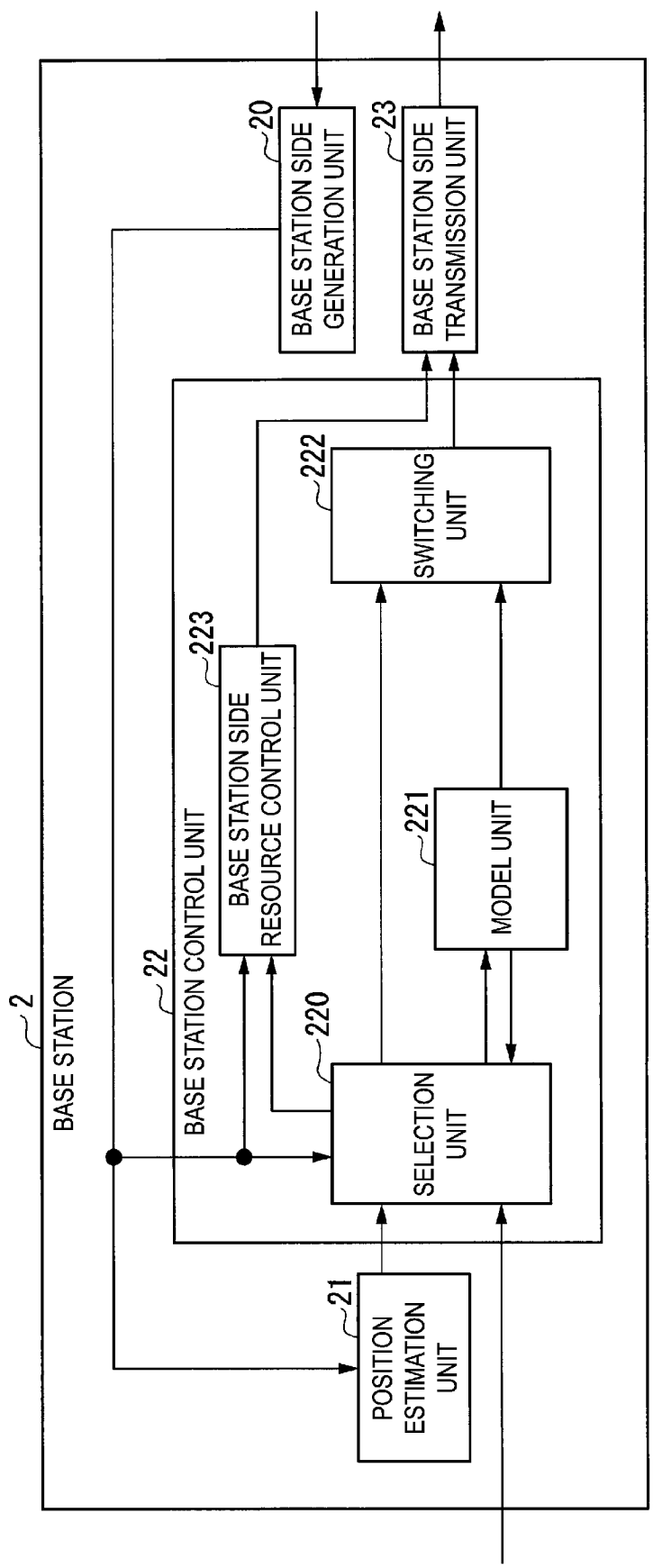
FIG. 2 is a diagram illustrating an example of a configuration of a base station control unit.

FIG. 2 is a diagram illustrating an example of a configuration of the base station control unit 22. The base station control unit 22 includes a selection unit 220, a model unit 221, a switching unit 222, and a base station side resource control unit 223. Some or all of the respective function units are implemented by a processor such as a Central Processing Unit (CPU) executing a program stored in a storage device. Preferably, the storage device is, for example, a non-volatile recording medium (a non-transitory recording medium) such as flash memory or Hard Disk Drive (HDD). The storage device may include a volatile recording medium such as a Random Access Memory (RAM). Some or all of the functional units may be implemented using hardware such as Large Scale Integration (LSI) or an Application Specific Integrated Circuit (ASIC), for example.

The selection unit 220 acquires the quality environment position supervised data from the external device. The selection unit 220 acquires the radio wave environment information, the terminal identification information, and the request signal or the error information from the base station side generation unit 20. The selection unit 220 generates the communication quality information on the basis of the radio wave environment information. The selection unit 220 acquires the terminal position information from the position estimation unit 21. The selection unit 220 generates additional quality environment position supervised data on the basis of the communication quality information, the radio wave environment information, and the terminal position information. The selection unit 220 selects quality environment position supervised data according to the terminal position information on the basis of a plurality of pieces of quality environment position supervised data. The selection unit 220 outputs the communication quality information and the radio wave environment information included in the selected quality environment position supervised data to the model unit 221.

In the selection unit 220, a throughput upper limit threshold value $P_{term}$, which is an upper limit threshold value of a throughput executable by the terminal 3a when the terminal 3a generates the communication quality information using the learning model data, is stored in a throughput database of the selection unit 220 for each terminal 3a in advance. A throughput executable by the terminal 3a is measured in advance when the terminal 3a is manufactured, for example. The selection unit 220 acquires the throughput database of the terminal 3a from, for example, an external device.

The selection unit 220 acquires a model number n (n is an integer from 1 to N; N is an integer equal to or greater than 2), which is an identification number of the learning model data, from the model unit 221 for each piece of learning model data.

The selection unit 220 selects the learning model data according to the terminal position information acquired from the position estimation unit 21, from among N pieces of learning model data stored in the model unit 221. The selection unit 220 outputs a signal indicating the model number n of the selected learning model data (hereinafter referred to as a "selection signal") to the switching unit 222.

The model unit 221 stores the learning model data for each piece of terminal position information, which is known information. The model unit 221 executes a learning process for the learning model data for each piece of terminal position information on the basis of the communication quality information and the radio wave environment information included in the selected quality environment position supervised data.

In the learning process, the model unit 221 generates the communication quality information, which is an output from the learning model data, through a computation process in which the radio wave environment information of the quality environment position supervised data is an input for the learning model data. The model unit 221 outputs a throughput determination signal indicating a determination result regarding the throughput, as a result of the learning process, to the selection unit 220.

In a case where the base station side resource control unit 223 has acquired the downlink communication resource control request information from the base station side generation unit 20, the base station side resource control unit 223 acquires the quality environment position supervised data from the selection unit 220. The base station side resource control unit 223 selects the communication resources for the downlink radio signal of the terminal 3a such that downlink communication quality is enhanced on the basis of the quality environment position supervised data. The base station side resource control unit 223 outputs a result of selecting the communication resources for the downlink radio signal to the base station side transmission unit 23.

The switching unit 222 acquires the selection signal from the selection unit 220. The switching unit 222 selects the learning model data stored in the model unit 221 on the basis of the selection signal. The switching unit 222 outputs the selected learning model data to the base station side transmission unit 23.

Next, an example of a configuration of the selection unit 220 and the model unit 221 will be described.

Figure 3:
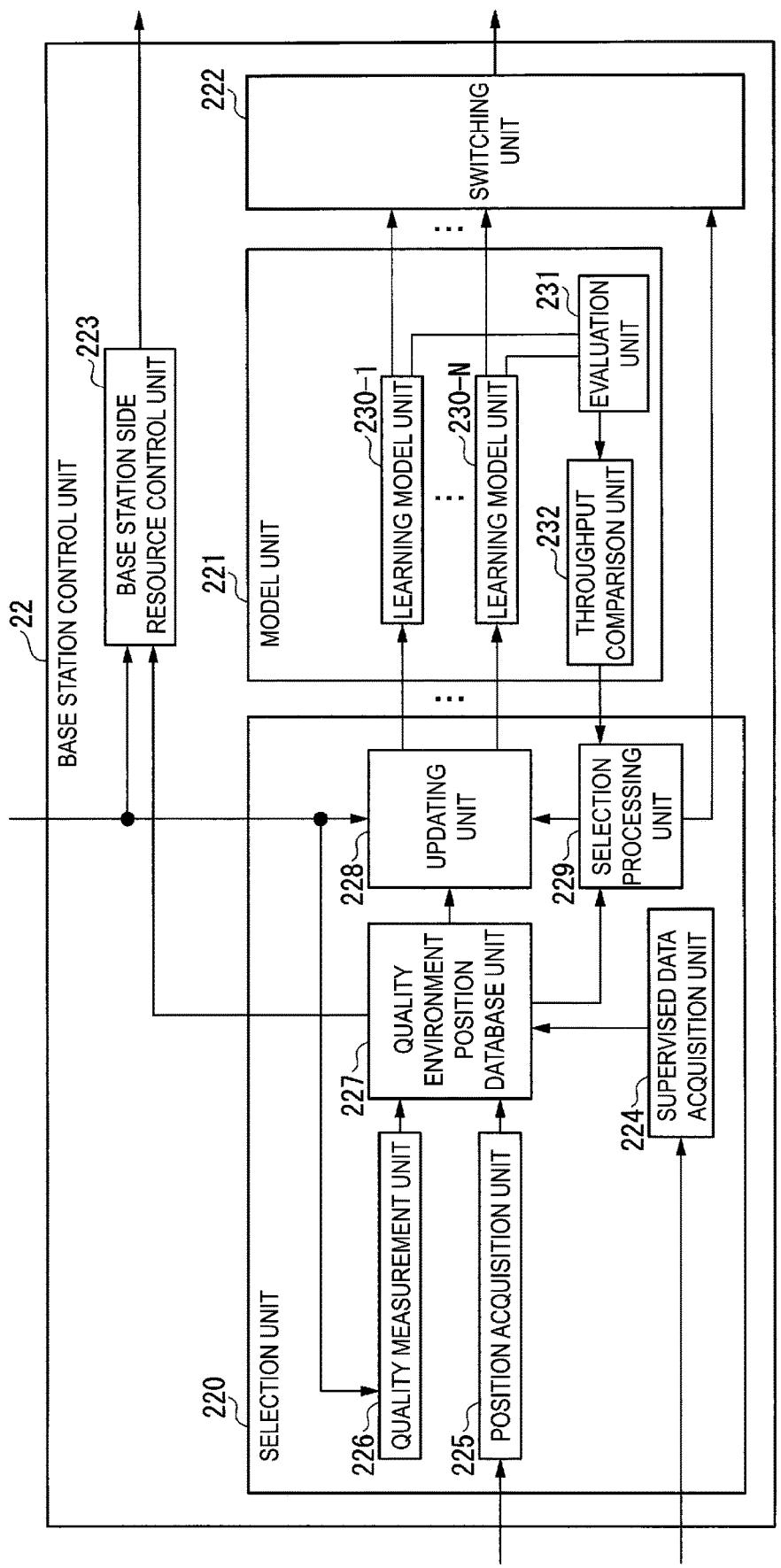
FIG. 3 is a diagram illustrating an example of a configuration of a selection unit and a model unit.

FIG. 3 is a diagram illustrating the example of the configuration of the selection unit 220 and the model unit 221. The selection unit 220 includes a supervised data acquisition unit 224, a position acquisition unit 225, a quality measurement unit 226, a quality environment position database unit 227, an updating unit 228, and a selection processing unit 229. The model unit 221 includes N learning model units 230, an evaluation unit 231, and a throughput comparison unit 232.

The supervised data acquisition unit 224 acquires the quality environment position supervised data from the external device. The quality environment position supervised data acquired here is, for example, quality environment position supervised data under other similar conditions. Furthermore, an initial value of the quality environment position supervised data acquired from the external device may be 0.

The position acquisition unit 225 acquires the terminal position information from the position estimation unit 21. The position acquisition unit 225 outputs the terminal position information to the quality environment position database unit 227.

The quality measurement unit 226 measures the communication quality information on the basis of the radio wave environment information.

The quality environment position database unit 227 stores the quality environment position supervised data acquired from the supervised data acquisition unit 224. The quality environment position database unit 227 acquires the communication quality information and the radio wave environment information from the quality measurement unit 226. The quality environment position database unit 227 acquires the terminal position information from the position acquisition unit 225. The quality environment position database unit 227 stores the communication quality information, the radio wave environment information, and the terminal position information in association with each other as additional quality environment position supervised data.

In a case where the updating unit 228 has acquired the request signal from the base station side generation unit 20, the updating unit 228 executes a learning process (updating) for the learning model data with the model number n by using the communication quality information and the radio wave environment information as inputs for each piece of learning model data until a stop signal is acquired from the selection processing unit 229. In a case where the error indicated by the error information is equal to or greater than a constant value, the updating unit 228 may execute the learning process for the learning model data with the model number n.

The learning model unit 230-n includes learning model data to which the model number n is assigned. The radio wave environment information is input for the learning model data, and the communication quality information is output from the learning model data. Note that, the radio wave environment information may be input for the learning model data, and the error information may be output from the learning model data.

The learning model units 230-1 to 230-N acquire the radio wave environment information and the communication quality information from the updating unit 228 in an ascending order from N=1. The learning model units 230-1 to 230-N execute a learning process for the learning model data with the model numbers 1 to N in an ascending order from N=1. The learning model data with the model numbers 1 to N is classified through the learning process according to the terminal position information, which is known information.

The evaluation unit 231 evaluates a throughput $P_{DL}$ of the learning process for each piece of learning model data in an ascending order from N=1. That is, the evaluation unit 231 detects the throughput $P_{DL}$ of the learning process for each piece of learning model data in an ascending order from N=1. The evaluation unit 231 outputs throughput information for each piece of learning model data to the throughput comparison unit 232 in an ascending order from N=1.

The throughput comparison unit 232 compares the throughput $P_{DL}$ of the learning process with the throughput upper limit threshold value $P_{term}$. The throughput comparison unit 232 determines whether the throughput $P_{DL}$ of the learning process exceeds the throughput upper limit threshold value $P_{term}$. The throughput comparison unit 232 outputs a throughput determination signal indicating whether the throughput $P_{DL}$ of the learning process exceeds the throughput upper limit threshold value $P_{term}$ to the selection processing unit 229.

In a case where the throughput determination signal indicates that the throughput $P_{DL}$ of the learning process exceeds the throughput upper limit threshold value $P_{term}$, the selection processing unit 229 outputs, to the updating unit 228, a model number (n+1) greater than a current model number n in which the learning process has been executed. In a case where the throughput determination signal indicates that the throughput $P_{DL}$ of the learning process is equal to or less than the throughput upper limit threshold value $P_{term}$, the selection processing unit 229 outputs the stop signal to the updating unit 228. In a case where the stop signal is output, a process in which the evaluation unit 231 evaluates the throughput $P_{DL}$ of the learning process for each piece of learning model data ends.

The selection processing unit 229 acquires terminal position information associated with the terminal position information on the terminal 3a from which the request signal or the error information has been acquired by the updating unit 228, from the position acquisition unit 225 via the quality environment position database unit 227. The selection processing unit 229 selects the learning model data associated with the terminal position information. The selection processing unit 229 outputs the selection signal to the switching unit 222. Note that, the selection processing unit 229 may output the selection signal to the switching unit 222 on the basis of a condition determined by an operator in advance and the terminal position information.

Next, a configuration of the terminal control unit 32a will be described.

Figure 4:
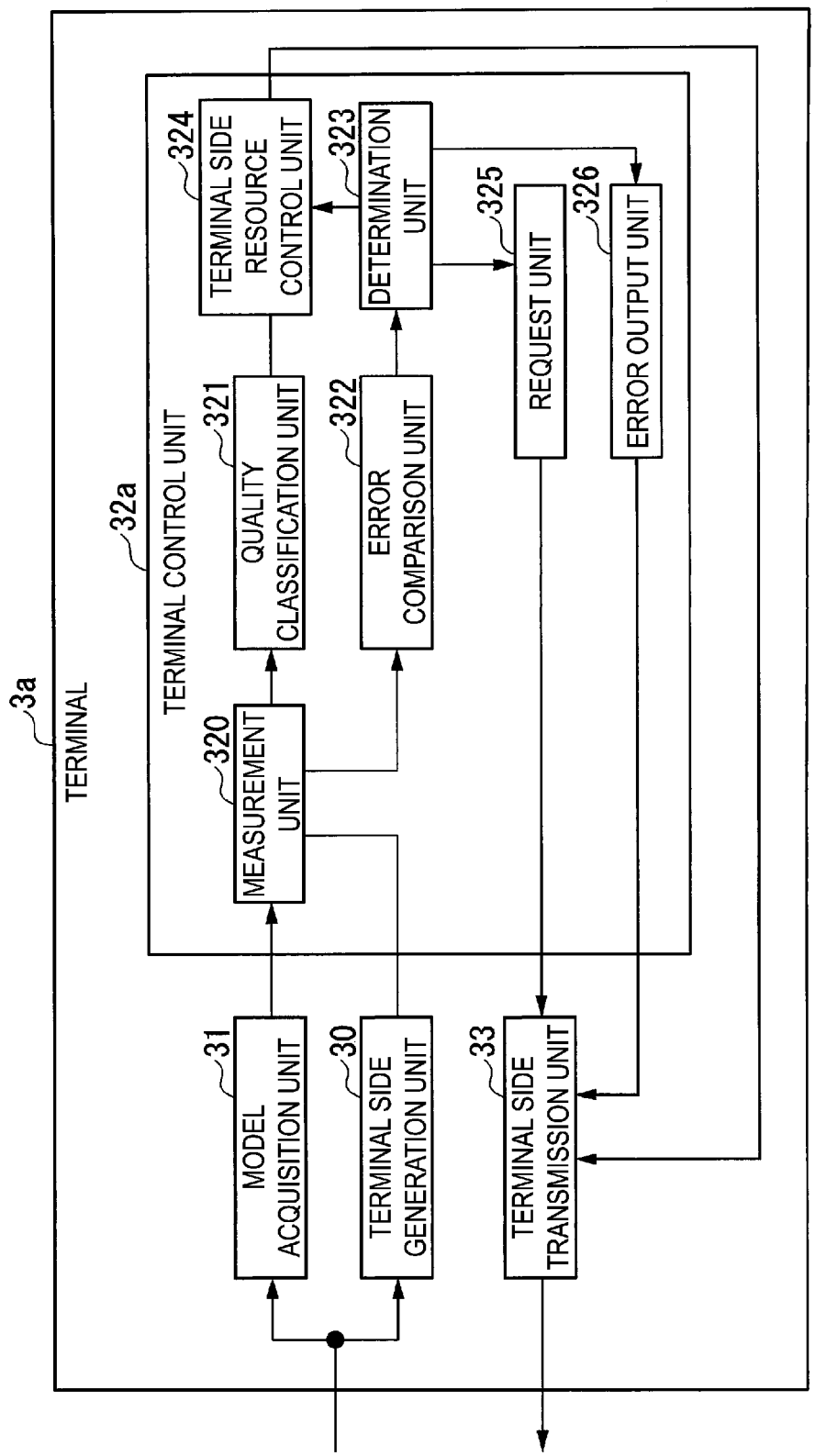
FIG. 4 is a diagram illustrating a first example of a configuration of a terminal control unit.

FIG. 4 is a diagram illustrating a first example of a configuration of the terminal control unit 32a. The terminal control unit 32a includes a measurement unit 320, a quality classification unit 321, an error comparison unit 322, a determination unit 323, a terminal side resource control unit 324, a request unit 325, and an error output unit 326.

The measurement unit 320 acquires the learning model data from the model acquisition unit 31. The measurement unit 320 acquires the radio wave environment information from the terminal side generation unit 30. The measurement unit 320 calculates the communication quality information by using the radio wave environment information as the input for the learning model data. The measurement unit 320 outputs the communication quality information to the quality classification unit 321. Note that, the measurement unit 320 may calculate the error information by using the radio wave environment information as the input for the learning model data. The measurement unit 320 may output the error information to the error comparison unit 322.

The quality classification unit 321 classifies the communication quality information and outputs classification result information, which is information indicating a classification result, to the terminal side resource control unit 324.

Figure 5:
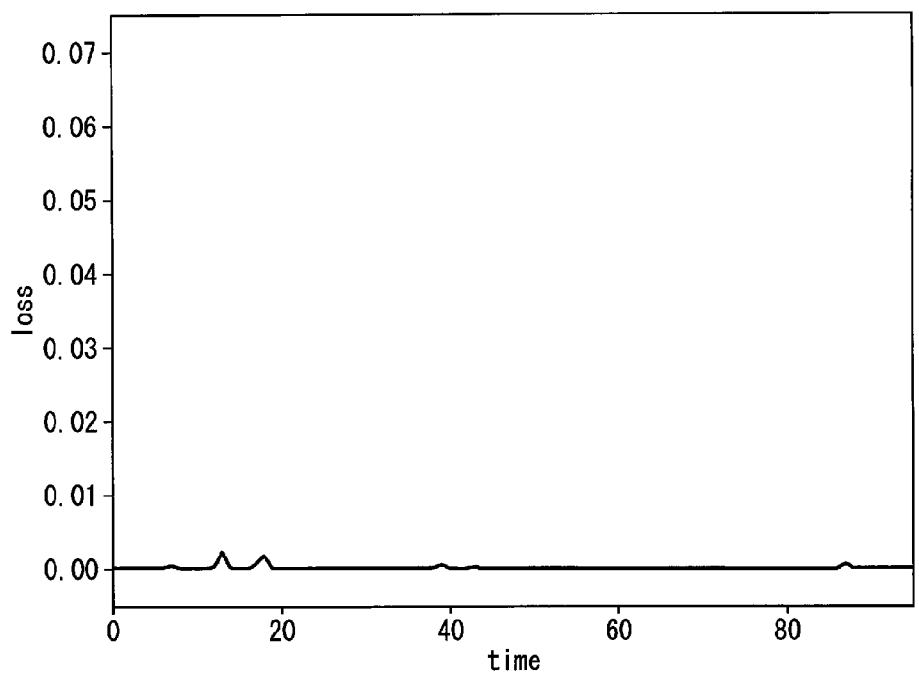
FIG. 5 is a diagram illustrating an example of a squared error between an actually measured value of communication quality based on a radio signal and a measured value of communication quality based on learning model data in an environment with less radio wave interference.

FIG. 5 is a diagram illustrating an example of a squared error between an actually measured value of communication quality based on a radio signal and a measured value of communication quality based on the learning model data in an environment with less radio wave interference. A horizontal axis indicates a time. A vertical axis indicates the squared error (loss). In a case where the uplink radio signal is transmitted while satisfying the communication quality assumed by the base station 2, the error value (squared error) indicated by the error information generated by the measurement unit 320 is less than a predetermined value.

Figure 6:
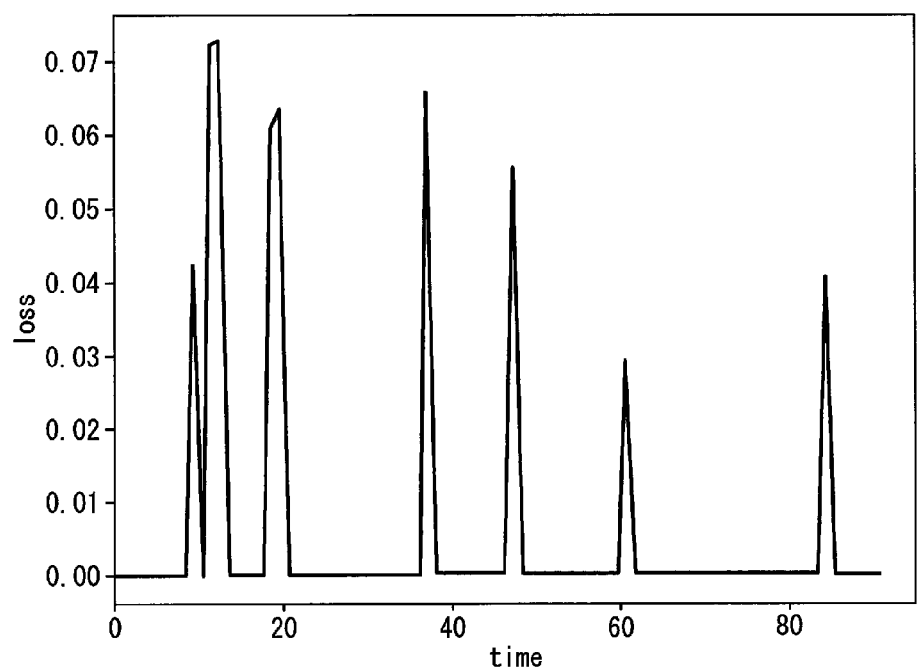
FIG. 6 is a diagram illustrating an example of a squared error between an actually measured value of communication quality based on a radio signal and a measured value of communication quality based on learning model data in an environment with much interference.

FIG. 6 is a diagram illustrating an example of a squared error between an actually measured value of communication quality based on a radio signal and a measured value of communication quality based on the learning model data in an environment with much interference. A horizontal axis indicates a time. A vertical axis indicates the squared error. In a case where an interference greater than an expected interference occurs due to an indefinite interval of reception of the radio signal (received packet missing), signal attenuation, and interference from other terminals, a CSMA/CA backoff time is longer than an assumed time. Thus, a communication environment deteriorates, and an error value increases.

The error comparison unit 322 generates error comparison result information indicating whether the squared error of the parameter value included in the communication quality information is equal to or greater than a predetermined value. A squared error function for the parameter values included in the communication quality information outputs a value less than a predetermined threshold value in a case where the radio wave environment information similar to normal radio wave environment information assumed in the learning phase is input to the learning model data. Furthermore, the squared error function for the parameter values included in the communication quality information outputs a value equal to or greater than the predetermined threshold value in a case where non-normal radio wave environment information in which packet queuing, packet missing, signal attenuation, or the like occur is input to the learning model data. The error comparison unit 322 outputs the error comparison result information to the determination unit 323.

The determination unit 323 executes an integration process, an averaging process, and the like for the error comparison result information. The determination unit 323 determines whether the radio wave environment is a radio wave environment assumed by the base station 2 on the basis of average error information indicating a result of the integration process, the averaging process, and the like for the error comparison result information.

In a case where the determination unit 323 has determined that the radio wave environment is not a radio wave environment assumed by the base station 2 on the basis of the output of the squared error function, the determination unit 323 outputs a signal for requesting control of communication resources (hereinafter, referred to as a "communication resource change request signal") to the terminal side resource control unit 324. That is, in a case where the result of the integration process, the averaging process, and the like for the error comparison result information is equal to or greater than a predetermined error value, the determination unit 323 outputs a request signal to the request unit 325. In a case where the result of the integration process, the averaging process, and the like for the error comparison result information is equal to or greater than the predetermined error value, the determination unit 323 outputs the error information to the error output unit 326.

In a case where the terminal side resource control unit 324 has acquired the communication resource change request signal, the terminal side resource control unit 324 executes control of a resource request on the basis of the classification result information and a predetermined algorithm.

The request unit 325 outputs the request signal acquired from the determination unit 323 to the terminal side transmission unit 33. The error output unit 326 outputs the error information acquired from the determination unit 323 to the terminal side transmission unit 33. In a case where the result of the integration process, the averaging process, and the like for the error comparison result information is less than the predetermined error value, the measurement unit 320 does not acquire new learning model data from the base station 2. Thus, learning model data distributed from the base station 2 continues to be used.

Next, an example of an operation of the wireless communication system 1 will be described.

Figure 7:
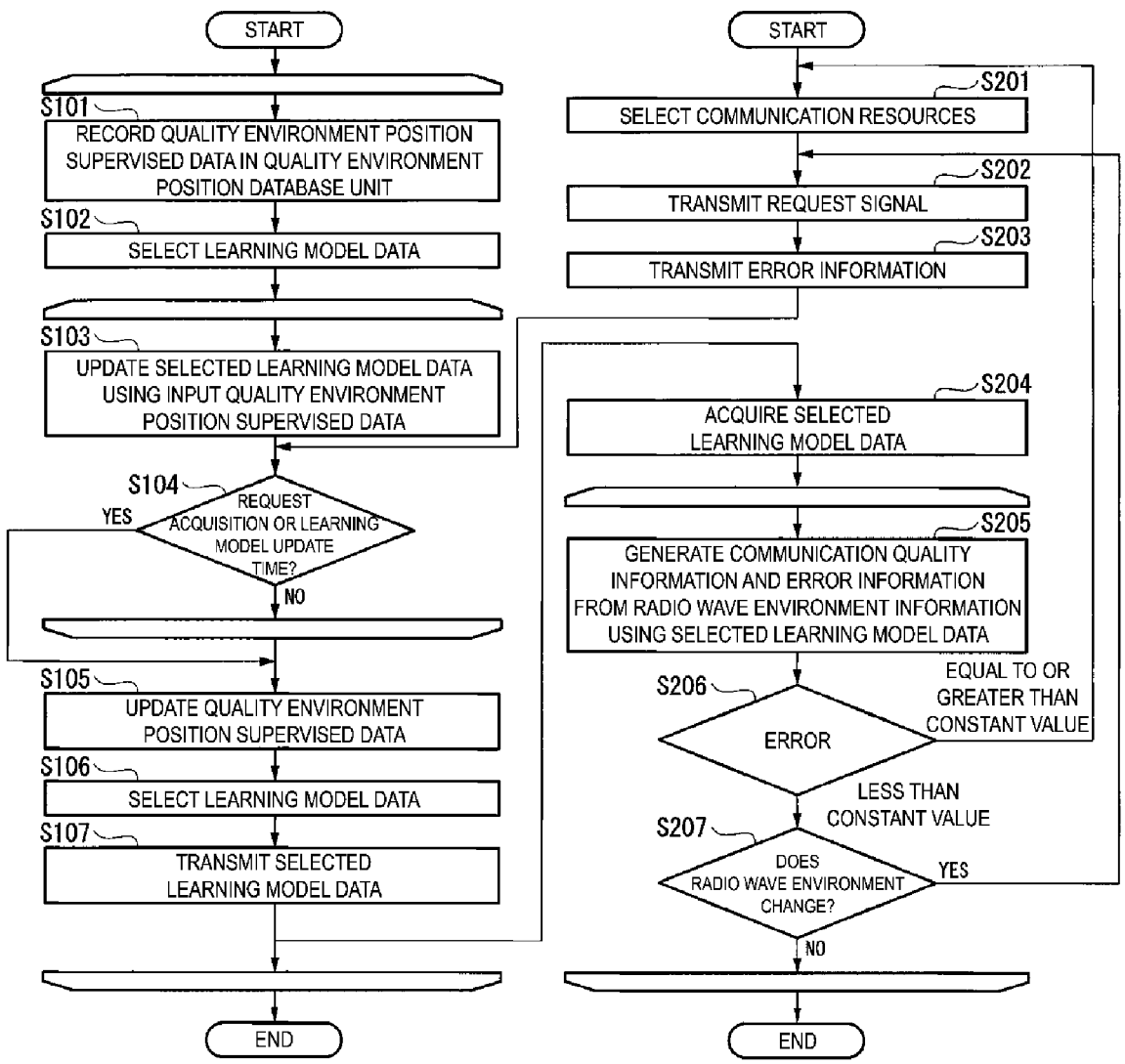
FIG. 7 is a flowchart illustrating a first example of an operation of a wireless communication system.

FIG. 7 is a flowchart illustrating an example of an operation of the wireless communication system 1. The base station 2 repeatedly executes steps S101 to S107. The base station 2 repeatedly executes steps S103 and S104. The terminal 3a repeatedly executes steps S205 to S207.

The supervised data acquisition unit 224 records the quality environment position supervised data acquired from the external device in the quality environment position database unit 227. The quality measurement unit 226 adds the quality environment position supervised data based on the generated radio wave environment information or the like to the quality environment position database unit 227 (step S101). The updating unit 228 selects the learning model data (step S102). The updating unit 228 updates the selected learning model data using the input quality environment position supervised data (step S103).

The updating unit 228 determines whether the request signal has been acquired. The updating unit 228 may determine whether a current time has reached a learning model update time. The learning model update time is a predetermined time for updating the learning model (step S104). In a case where the request signal has not been acquired (NO in step S104), the process in the updating unit 228 returns to step S103. In a case where the request signal has been acquired (YES in step S104), the updating unit 228 updates the quality environment position supervised data of the quality environment position database unit 227 on the basis of the quality environment position supervised data based on the generated radio wave environment information or the like (step S105).

The selection processing unit 229 selects the learning model data on the basis of the terminal position information and outputs the selection signal to the switching unit 222 (step S106). The switching unit 222 outputs the learning model data selected on the basis of the selection signal to the base station side transmission unit 23. The base station side transmission unit 23 transmits the selected learning model data to the terminal 3a to which the terminal identification information acquired in the base station side generation unit 20 is allocated, using the communication resources for the downlink radio signal selected by the base station side resource control unit 223 (step S107).

The terminal side resource control unit 324 selects communication resources for the uplink radio signal on the basis of the communication quality information or the error information. The terminal side resource control unit 324 transmits the downlink communication resource control request information including a result of selecting the communication resources for the uplink radio signal to the base station side resource control unit 223 via the terminal side transmission unit 33 (step S201). In a case where the determination unit 323 has determined that the error is equal to or greater than a threshold value, the request unit 325 transmits the request signal to the base station 2 via the terminal side transmission unit 33 (step S202). In a case where the determination unit 323 has determined that the error is equal to or greater than the threshold value, the error output unit 326 transmits the error information to the base station 2 via the terminal side transmission unit 33 (step S203).

The model acquisition unit 31 acquires the selected learning model data (step S204). The measurement unit 320 generates the communication quality information and the error information from the radio wave environment information using the selected learning model data (step S205). The determination unit 323 determines whether the error is equal to or greater than the constant value (step S206). In a case where the determination unit 323 has determine that the error is equal to or greater than the constant value (step S206: equal to or greater than the constant value), the terminal side resource control unit 324 executes the process of step S201. In a case where the determination unit 323 has determine that the error is less than the constant value (step S206: less than the constant value), the terminal side resource control unit 324 determines whether the radio wave environment has changed (step S207).

In a case where the terminal side resource control unit 324 has determined that the radio wave environment has changed (YES in step S207), the request unit 325 executes step S202. In a case where the terminal side resource control unit 324 has not determined that the radio wave environment has changed (NO in step S207), the measurement unit 320 executes the process of step S205.

As described above, the wireless communication system 1 of the first embodiment includes the base station 2 and the terminal 3a. The base station 2 includes a base station side generation unit 20, a model unit 221, a selection unit 220, and a base station side transmission unit 23. The base station side generation unit 20 generates the radio wave environment information in the cell on the basis of the uplink radio signal. The model unit 221 stores, for each piece of known information, the learning model data with which the communication quality information can be generated on the basis of the radio wave environment information with a throughput equal to or less than a threshold value. The selection unit 220 selects the learning model data on the basis of the known information. The base station side transmission unit 23 transmits the selected learning model data and the downlink radio signal. The terminal 3a includes the terminal side generation unit 30, the model acquisition unit 31, the measurement unit 320, and the terminal side resource control unit 324. The terminal side generation unit 30 acquires the downlink radio signal. The terminal side generation unit 30 generates the radio wave environment information on the basis of the downlink radio signal. The model acquisition unit 31 acquires the learning model data. The measurement unit 320 generates the communication quality information on the basis of the acquired learning model data and the radio wave environment information. The terminal side resource control unit 324 selects the communication resources for the uplink radio signal on the basis of a result of classifying the generated communication quality information. Thus, the terminal side resource control unit 324 can execute at least the resource control for the uplink radio signal according to the radio wave environment. In a case where the base station side resource control unit 223 has acquired the downlink communication resource control request information including the result of selecting the communication resources for the uplink radio signal from the terminal side resource control unit 324, the base station side resource control unit 223 selects the communication resources for the downlink radio signal such that communication quality of the downlink radio signal is enhanced, on the basis of the result of selecting the communication resources for the uplink radio signal and the quality environment position supervised data. Thus, the terminal side resource control unit 324 can also control the communication resources for the downlink radio signal as a result of transmitting the downlink communication resource control request information to the base station side resource control unit 223.

In this way, the wireless communication system 1 of the first embodiment can cause each terminal 3a to execute resource control according to the radio wave environment.

Through a series of processes, the base station 2 executes the learning process for an accommodation cell, and the terminal 3a receives a learning result and executes a process. Thus, problems do not arise even in an overlearning state, which causes a problem when machine learning is executed. Furthermore, the wireless communication system 1 can receive results of machine learning according to the position of the terminal 3a, or the like.

The wireless communication system 1 can easily recognize the radio wave environment without using a complex statistical model. The wireless communication system 1 can collect supervised data necessary for machine learning. The wireless communication system 1 can recognize the radio wave environment at a specific position by reducing a throughput of the terminal 3a and applying machine learning.

The learning model data in the wireless communication system 1 can be adaptively distributed to the terminal 3a in an adaptive learning model distribution process using the request signal from the terminal 3a as a trigger. The learning model data in the wireless communication system 1 can be adaptively distributed to the terminal 3a on the basis of error information indicating that the learning model data applied on the terminal 3a is not appropriate. The learning model data in the wireless communication system 1 can be adaptively distributed to the terminal 3a on the basis of known information such as the terminal position information.

Second Embodiment

A second embodiment is different from the first embodiment in that the terminal weights the parameter value (multiplies the parameter value by a coefficient) such that an influence of the parameter value of the communication quality information, such as the received power value and an arrival time of the downlink radio signal, on an output of the error function is increased or decreased. Only differences between the second embodiment and the first embodiment will be described.

In the first embodiment, since the squared error that is a function value of the error function is increased in a case where the radio wave environment information different from normal radio wave environment information is input to the learning model data, the determination unit 323 outputs the communication resource change request signal to the terminal side resource control unit 324. However, since wireless communication is susceptible to change in a radio wave environment of surroundings, the amount of data of required quality environment position supervised data is large.

Communication quality such as a throughput or a BER may be better than communication quality assumed by the base station 2 as long as quality environment position supervised data of an ideal radio wave environment (an environment in which a theoretical limit value of a communication standard is achieved) is not prepared. Thus, even in a case in which the radio wave environment is better than an assumed radio wave environment, the determination unit 323 outputs the communication resource change request signal to the terminal side resource control unit 324.

Thus, in a case where quality environment position supervised data is prepared in an ideal perfect environment by simulation, the error value (the squared error) of the error function will increase even at the time of normal operation in which communication stabilizes. Furthermore, the amount of data becomes larger as described above, and this makes it difficult to execute a learning process in all input situations with a possible throughput of a terminal that actually performs communication.

In the second embodiment, the terminal defines parameters that generally improve communication quality (arrival time of radio signal: small, received power of radio signal: high) in order to simplify complicated learning model data.

Figure 8:
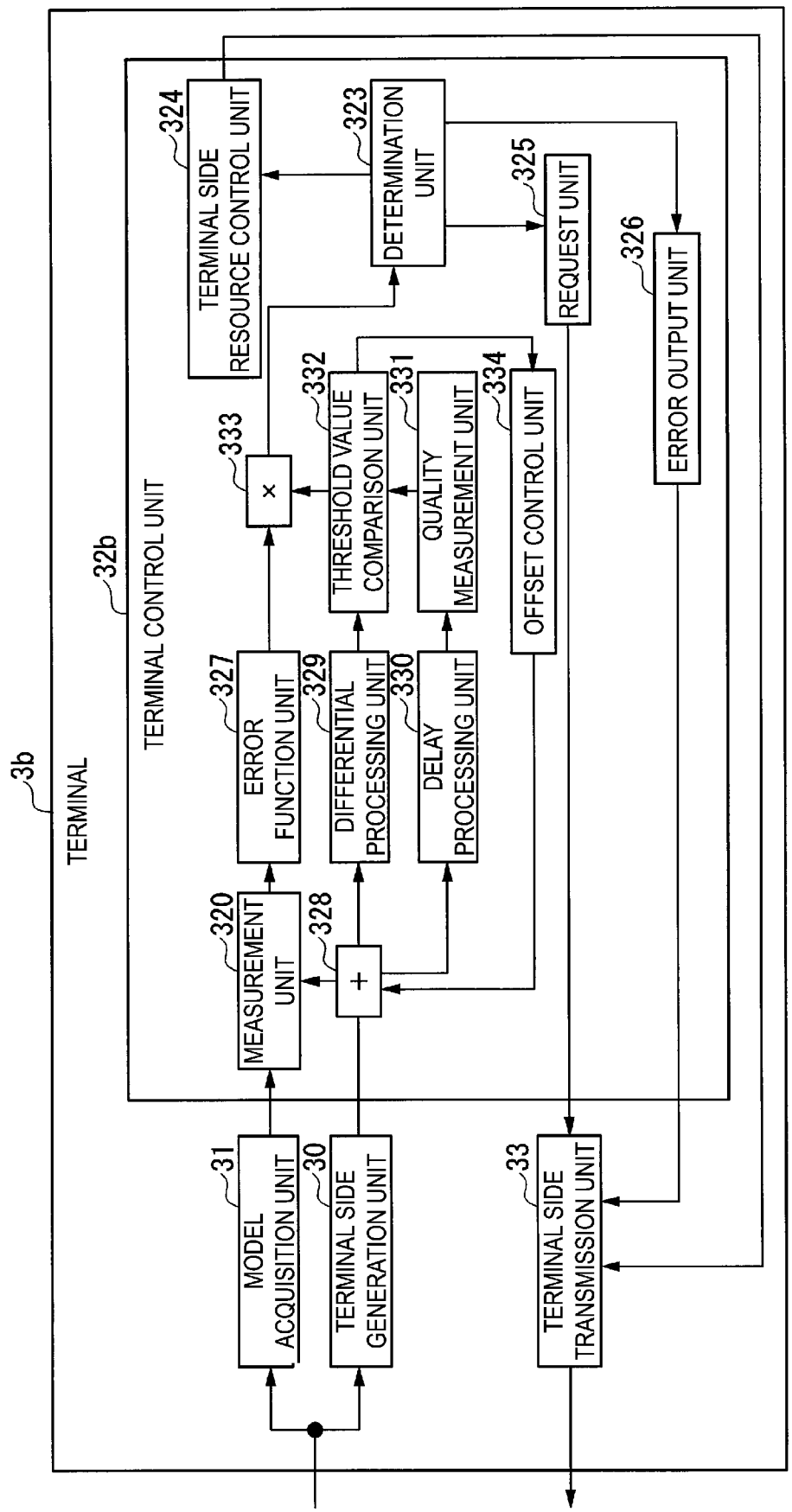
FIG. 8 is a diagram illustrating a second example of a configuration of a terminal control unit.

FIG. 8 is a diagram illustrating an example of a configuration of a terminal control unit 32b. The wireless communication system 1 includes the base station 2 (base station device) and the one or more terminals 3b (terminal devices). The terminal 3b includes the terminal side generation unit 30, the model acquisition unit 31, the terminal side transmission unit 33, and the terminal control unit 32b. The terminal control unit 32b includes the measurement unit 320, the determination unit 323, the terminal side resource control unit 324, the request unit 325, the error output unit 326, an error function unit 327, an addition unit 328, a differential processing unit 329, a delay processing unit 330, a quality measurement unit 331, a threshold value comparison unit 332, a multiplication unit 333, and an offset control unit 334. The terminal control unit 32b may not include the quality classification unit 321 and the error comparison unit 322.

The measurement unit 320 acquires the radio wave environment information with the offset value added thereto from the addition unit 328.

The error function unit 327 acquires the communication quality information from the measurement unit 320. The error function unit 327 generates error information on the parameter value of the communication quality information. For example, in a case where the received power stabilizes in a state in which the received power is greater than assumed received power, the squared error, which is error information, increases.

The addition unit 328 acquires an offset value from the offset control unit 334. The addition unit 328 outputs the radio wave environment information with the acquired offset value added thereto, to the measurement unit 320, the differential processing unit 329, and the delay processing unit 330.

The differential processing unit 329 outputs, to the threshold value comparison unit 332, a result (hereinafter, referred to as a "differential value") in which the parameter value included in the radio wave environment information is differentiated with the offset value added thereto by the addition unit 328.

The delay processing unit 330 acquires the radio wave environment information with the offset value added thereto by the addition unit 328 from the addition unit 328. The delay processing unit 330 delays propagation of the radio wave environment information with the offset value added thereto. That is, the delay processing unit 330 outputs the radio wave environment information with the offset value added thereto to the quality measurement unit 331 after a certain time has elapsed from a time at which the radio wave environment information with the offset value added thereto has been acquired.

The quality measurement unit 331 measures the communication quality on the basis of the radio wave environment information with the offset value added thereto. The quality measurement unit 331 outputs the measurement result of the communication quality to the threshold value comparison unit 332. The quality measurement unit 331 may output the received power value included in the radio wave environment information to the threshold value comparison unit 332 as the measurement result of the communication quality.

The threshold value comparison unit 332 (an adjustment unit) increases a coefficient α (a weighting value) between 0 and 1 in a case where the measurement result of the communication quality has been less than assumed quality (the squared error has increased). The threshold value comparison unit 332 decreases the coefficient α between 0 and 1 in a case where the measurement result of the communication quality has been greater than the assumed quality (the squared error has decreased).

The threshold value comparison unit 332 determines whether the differential value exceeds a predetermined differential threshold value. In a case where the differential value exceeds the predetermined differential threshold value, the threshold value comparison unit 332 outputs the coefficient α to the multiplication unit 333 and the offset control unit 334.

The threshold value comparison unit 332 adjusts the parameter values included in the radio wave environment information generated by the terminal side generation unit 30. For example, the threshold value comparison unit 332 determines whether a received power value P1 included in the radio wave environment information of a current time is equal to or greater than a received power value P0 included in radio wave environment information of a previous time. In a case where the received power value P1 included in the radio wave environment information of the current time is equal to or greater than the received power value P0 included in the radio wave environment information of the previous time, the threshold value comparison unit 332 outputs the coefficient α to the offset control unit 334.

The threshold value comparison unit 332 adjusts the squared error, which is the error information generated by the error function unit 327. For example, in a case where the received power value P1 included in the radio wave environment information of the current time is less than the received power value P0 included in the radio wave environment information of the previous time, the threshold value comparison unit 332 outputs the coefficient α to the multiplication unit 333. In a case where the received power value P1 of the current time is equal to or greater than the received power value P0 of the previous time, the threshold value comparison unit 332 may output the coefficient α to the multiplication unit 333 regardless of the differential value.

The multiplication unit 333 (an adjustment unit) adjusts the squared error, which is the error information generated by the error function unit 327. That is, the multiplication unit 333 multiplies the squared error, which is the error information, by the coefficient α. This allows the multiplication unit 333 to reduce an influence of change in the radio wave environment, such as the received power, on the integration process and the averaging process in the determination unit 323.

The offset control unit 334 outputs an offset value according to the coefficient α to the addition unit 328 such that the differential value does not exceed the differential threshold value. The offset value is, for example, a difference between the received power value P0 before the differential value exceeds the differential threshold value and the received power value P1 after the differential value exceeds the differential threshold value.

Next, an example of an operation of the wireless communication system 1 will be described.

Figure 9:
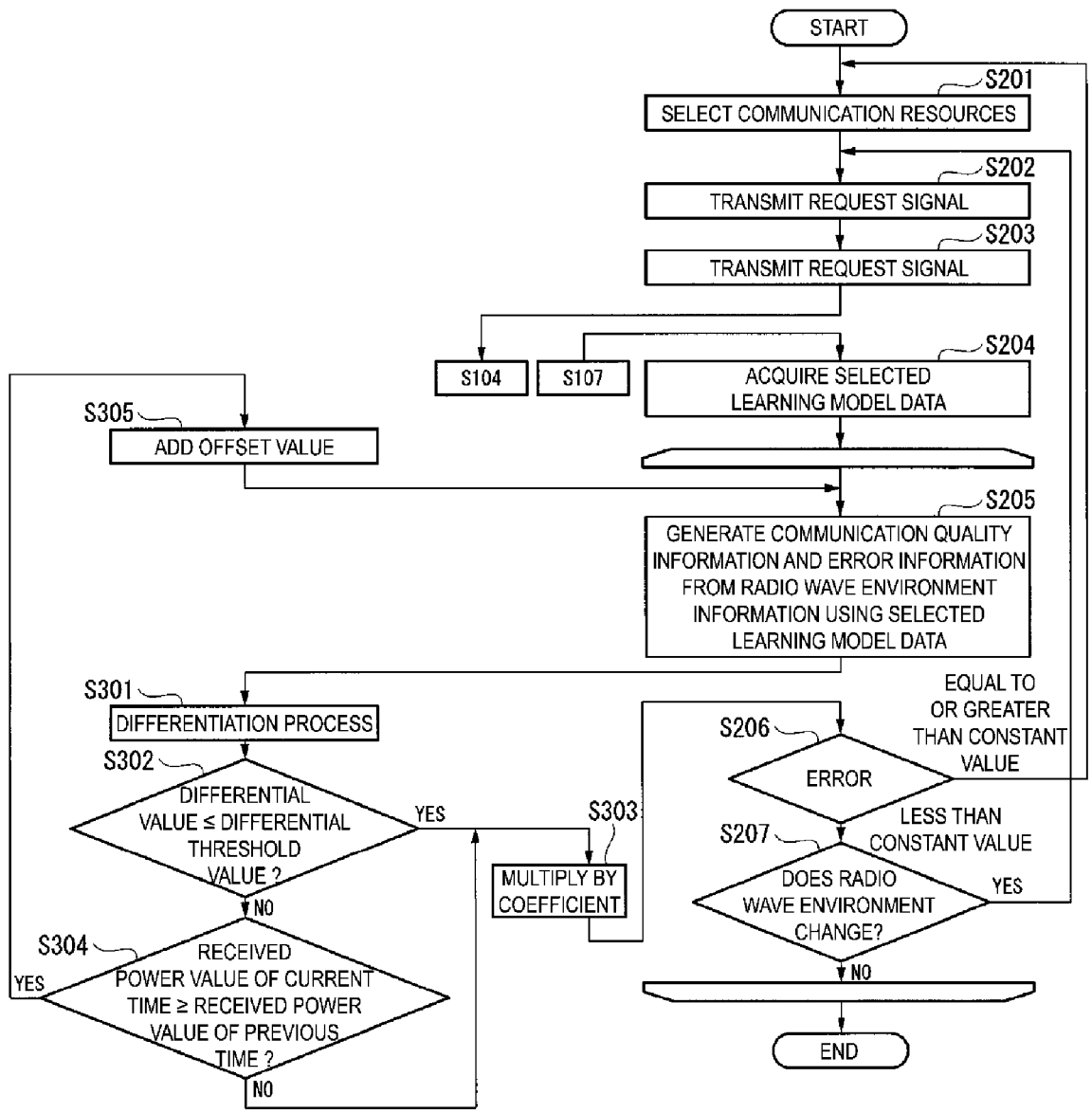
FIG. 9 is a flowchart illustrating a second example of an operation of a wireless communication system.

FIG. 9 is a flowchart illustrating an example of an operation of the wireless communication system 1. Each of processes from step S201 to step S207 in FIG. 9 is the same as each of the processes from step S201 to step S207 in FIG. 7.

In a case where step S205 has been executed, the differential processing unit 329 executes a differentiation process and outputs a differential value to the threshold value comparison unit 332 (step S301). The threshold value comparison unit 332 determines whether the differential value exceeds the predetermined differential threshold value (step S302). In a case where the differential value exceeds the predetermined differential threshold value (YES in step S302), the multiplication unit 333 multiplies the squared error, which is the error information generated by the error function unit 327, by the coefficient α (step S303). The determination unit 323 executes the process of step S206.

In a case where the differential value is equal to or less than the differential threshold value (YES in step S302), the multiplication unit 333 multiplies the squared error, which is the error information, by the coefficient α (step S303). The determination unit 323 executes the process of step S206.

In a case where the differential value exceeds the differential threshold value (NO in step S302), the threshold value comparison unit 332 determines whether the received power value P1 is equal to or greater than the received power value P0 (step S304).

In a case where the received power value P1 is less than the received power value P0 (NO in step S304), the multiplication unit 333 executes the process of step S303.

In a case where the received power value P1 is equal to or greater than the received power value P0 (YES in step S304), the addition unit 328 outputs the radio wave environment information with the acquired offset value added thereto to the measurement unit 320, the differential processing unit 329, and the delay processing unit 330 (step S305). The measurement unit 320 executes the process of step S205.

As described above, the terminal control unit 32b of the second embodiment further includes the multiplication unit 333, unlike the terminal control unit 32a. The multiplication unit 333 adjusts the error of the parameter value of the communication quality information according to the communication quality. The terminal side resource control unit 324 controls the communication resources for the radio signal on the basis of a determination result according to the communication quality information in which the error of the parameter value has been adjusted.

In this way, the wireless communication system 1 of the second embodiment can cause each terminal 3b to execute resource control according to the radio wave environment. The wireless communication system 1 can prevent resource switching from being immediately executed. The wireless communication system 1 can prevent the request signal from being wrongly transmitted in a case where the communication quality is improved in the cell.

INDUSTRIAL APPLICABILITY

The present invention is applicable to a wireless communication system including a base station and a terminal.

REFERENCE SIGNS LIST

1 Wireless communication system
2 Base station
3a, 3b Terminal
20 Base station side generation unit
21 Position estimation unit
22 Base station control unit
23 Base station side transmission unit
30 Terminal side generation unit
31 Model acquisition unit
32a, 32b Terminal control unit
33 Terminal side transmission unit
220 Selection unit
221 Model unit
222 Switching unit
223 Base station side resource control unit
224 Supervised data acquisition unit
225 Position acquisition unit
226 Quality measurement unit
227 Quality environment position database unit
228 Updating unit
229 Selection processing unit
230 Learning model unit
231 Evaluation unit
232 Throughput comparison unit
320 Measurement unit
321 Quality classification unit
322 Error comparison unit 323 Determination unit
324 Terminal side resource control unit
325 Request unit
326 Error output unit
327 Error function unit
328 Addition unit
329 Differential processing unit
330 Delay processing unit
331 Quality measurement unit
332 Threshold value comparison unit
333 Multiplication unit
334 Offset control unit

The invention claimed is:

1. A computer-implemented method for wireless communication, the method comprising:
generating, by a base station, information on radio wave environment in a cell based on an uplink wireless signal received from one or more terminals in the cell;
storing, for one or more pieces of terminal position information for the one or more terminals in the cell, learning model data for a learning model based on the information on the radio wave environment, wherein the learning model is for generating information on communication quality at an amount of processing that is equal to or less than a predetermined threshold based on the learning model data;
selecting at least a part of the learning model data based on the one or more pieces of terminal position information; and
transmitting, by the base station, the selected at least a part of the learning model data through a downlink wireless signal, causing a receiving terminal in the cell to:
generate information on communication quality based on the selected at least a part of the learning model data and information on the radio wave environment in the cell based on the downlink wireless signal, and
control communication resources for processing wireless signals based at least on the generated information on communication quality, wherein the wireless signals include at least either the downlink wireless signal or the uplink wireless signal.

2. The computer-implemented method of claim 1, the method further comprising:
estimating positions of the one or more terminals in the cell; and
generating the one or more pieces of terminal position information based on the estimated positions.

3. The computer-implemented method of claim 1, the method further comprising:
until the amount of processing is more than a predetermined threshold, recursively updating, by the base station, the learning model data based on supervised data, wherein the supervised data is based on a combination of the information on communication quality, the information on radio wave environment, and the terminal position information.

4. The computer-implemented method of claim 1, the method further comprising:
receiving, by the base station, a request signal from one of the one or more terminals in the cell; and
updating the learning model data based on the request signal.

5. The computer-implemented method of claim 1, wherein the transmitting of the selected at least a part of the learning model data further causes the receiving terminal in the cell to:
generate the information on communication quality based on the selected at least a part of the learning model data;
determine an error in one or more parameters of the generated information on the communication quality based on a difference between the one or more parameters of the generated information on the communication quality and a set of reference values based on learning operations of the learning model;
adjust the one or more parameters of the generated information on the communication quality based on the determined error; and
control the communication resources for processing the wireless signals using the adjusted one or more parameters of the generated information on the communication quality.

6. The computer-implemented method of claim 1, wherein the information on radio wave environment comprises one or more of:
transmission power based on one or more signal strengths,
interference based on one or more data error rates, and
reflection of transmitted radio waves.

7. The computer-implemented method of claim 1, wherein the information on the communication quality includes one or more throughputs of data communication by the one or more terminals in the cell.

8. A system for wireless communication, the system comprising:
a processor; and
a memory storing computer-executable instructions that when executed by the processor cause the system to:
generate, by a base station, information on radio wave environment in a cell based on an uplink wireless signal received from one or more terminals in the cell;
store, for one or more pieces of terminal position information for the one or more terminals in the cell, learning model data for a learning model based on the information on the radio wave environment, wherein the learning model is for generating information on the communication quality at an amount of processing that is equal to or less than a predetermined threshold based on the learning model data;
select at least a part of the learning model data based on the one or more pieces of terminal position information; and
transmit, by the base station, the selected at least a part of the learning model data through a downlink wireless signal, causing a receiving terminal in the cell to:
generate information on communication quality based on the selected at least a part of the learning model data and information on the radio wave environment in the cell based on the downlink wireless signal, and
control communication resources for processing wireless signals based at least on the generated information on the communication quality, wherein the wireless signals include at least either the downlink wireless signal or the uplink wireless signal.

9. The system of claim 8, the computer-executable instructions when executed further causing the system to:
estimate positions of the one or more terminals in the cell; and
generate the one or more pieces of terminal position information based on the estimated positions.

10. The system of claim 8, the computer-executable instructions when executed further causing the system to:
  until the amount of processing is more than a predetermined threshold, recursively update, by the base station, the learning model data based on supervised data, wherein the supervised data is based on a combination of the information on the communication quality, the information on the radio wave environment, and the terminal position information.

11. The system of claim 8, the computer-executable instructions when executed further causing the system to:
  receive, by the base station, a request signal from one of the one or more terminals in the cell; and
  update the learning model data based on the request signal.

12. The system of claim 8, wherein the transmitting of the selected at least a part of the learning model data further causes the receiving terminal in the cell to:
  generate the information on the communication quality based on the selected at least a part of the learning model data;
  determine an error in one or more parameters of the generated information on the communication quality based on a difference between the one or more parameters of the generated information on the communication quality and a set of reference values based on learning operations of the learning model;
  adjust the one or more parameters of the generated information on communication quality based on the determined error; and
  control the communication resources for processing the wireless signals using the adjusted one or more parameters of the generated information on the communication quality.

13. The system of claim 8, wherein the information on the radio wave environment comprises one or more of:
  transmission power based on one or more signal strengths,
  interference based on one or more data error rates, and
  reflection of transmitted radio waves.

14. The system of claim 8, wherein the information on the communication quality includes one or more throughputs of data communication by the one or more terminals in the cell.

15. A computer-readable non-transitory recording medium storing computer-executable instructions that when executed by a processor cause a computer system to:
  generate, by a base station, information on radio wave environment in a cell based on an uplink wireless signal received from one or more terminals in the cell;
  store, for one or more pieces of terminal position information for the one or more terminals in the cell, learning model data for a learning model based on the information on the radio wave environment, wherein the learning model is for generating information on communication quality at an amount of processing that is equal to or less than a predetermined threshold based on the learning model data;
  select at least a part of the learning model data based on the one or more pieces of terminal position information; and
  transmit, by the base station, the selected at least a part of the learning model data through a downlink wireless signal, causing a receiving terminal in the cell to:
    generate information on communication quality based on the selected at least a part of the learning model data and information on the radio wave environment in the cell based on the downlink wireless signal, and
    control communication resources for processing wireless signals based at least on the generated information on communication quality, wherein the wireless signals include at least either the downlink wireless signal or the uplink wireless signal.

16. The computer-readable non-transitory recording medium of claim 15, wherein the computer-executable instructions when executed further cause the system to:
  estimate positions of the one or more terminals in the cell; and
  generate the one or more pieces of terminal position information based on the estimated positions.

17. The computer-readable non-transitory recording medium of claim 15, wherein the computer-executable instructions when executed further cause the system to:
  until the amount of processing is more than the predetermined threshold, recursively update, by the base station, the learning model data based on supervised data, wherein the supervised data is based on a combination of the information on the communication quality, the information on the radio wave environment, and the terminal position information.

18. The computer-readable non-transitory recording medium of claim 15, wherein the computer-executable instructions when executed further cause the system to:
  receive, by the base station, a request signal from one of the one or more terminals in the cell; and
  update the learning model data based on the request signal.

19. The computer-readable non-transitory recording medium of claim 15, wherein the transmitting of the selected at least a part of the learning model data further causes the receiving terminal in the cell to:
  generate the information on communication quality based on the selected at least a part of the learning model data;
  determine an error in one or more parameters of the generated information on the communication quality based on a difference between the one or more parameters of the generated information on the communication quality and a set of reference values based on learning operations of the learning model;
  adjust the one or more parameters of the generated information on the communication quality based on the determined error; and
  control the communication resources for processing the wireless signals using the adjusted one or more parameters of the generated information on the communication quality.

20. The computer-readable non-transitory recording medium of claim 15, wherein the information on the radio wave environment comprises one or more of:
  transmission power based on one or more signal strengths,
  interference based on one or more data error rates, and
  reflection of the transmitted radio waves.

* * * * *